United States Patent
Miller, II (10) Patent No.: US 10,003,131 B2
(45) Date of Patent: Jun. 19, 2018

(54) SYSTEM AND METHOD OF OPTICAL ANTENNA TUNING

(71) Applicant: AT&T Intellectual Property I, L.P., Atlanta, GA (US)

(72) Inventor: Robert R. Miller, II, Covent Stn., NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 786 days.

(21) Appl. No.: 14/084,200

(22) Filed: Nov. 19, 2013

(65) Prior Publication Data

US 2015/0138027 A1    May 21, 2015

(51) Int. Cl.
*H01Q 9/04* (2006.01)
*H01Q 9/14* (2006.01)
*H04B 10/80* (2013.01)

(52) U.S. Cl.
CPC .......... *H01Q 9/0442* (2013.01); *H01Q 9/145* (2013.01); *H04B 10/80* (2013.01)

(58) Field of Classification Search
CPC .......... H01Q 5/30; H01Q 5/314; H01Q 5/321; H01Q 9/0442; H01Q 9/145; H04B 10/80–10/808
See application file for complete search history.

(56) References Cited

U.S. PATENT DOCUMENTS

| | | | | |
|---|---|---|---|---|
| 4,381,566 A * | 4/1983 | Kane | ........................ | H01Q 1/36 343/713 |
| 4,546,249 A * | 10/1985 | Whitehouse | ........... | G11C 27/02 250/227.11 |
| 4,916,460 A * | 4/1990 | Powell | ................. | H01Q 3/2676 343/853 |
| 5,001,355 A | 3/1991 | Rosen et al. | | |
| 5,293,172 A | 3/1994 | Lamberty et al. | | |
| 5,296,867 A | 3/1994 | Jaquet | | |
| 5,367,310 A | 11/1994 | Warnagiris | | |
| 5,583,516 A * | 12/1996 | Lembo | ................. | G02B 6/2861 250/227.12 |
| 6,417,807 B1 | 7/2002 | Hsu et al. | | |
| 6,469,677 B1 | 10/2002 | Schaffner et al. | | |

(Continued)

FOREIGN PATENT DOCUMENTS

| | | |
|---|---|---|
| FR | 2759498 A1 | 8/1998 |
| JP | 2007174017 A * | 7/2007 |
| WO | 2004025877 A1 | 3/2004 |

OTHER PUBLICATIONS

International Search Report and Written Opinion for Application No. PCT/US2014/061835 dated Jan. 28, 2015, 12 pages.

(Continued)

*Primary Examiner* — Dameon E Levi
*Assistant Examiner* — Jennifer F Hu
(74) *Attorney, Agent, or Firm* — Toler Law Group, PC (57) ABSTRACT

A method includes determining a configuration of an antenna. The method also includes selecting a first light source of a plurality of light sources based on the configuration. The method further includes activating the first light source and transmitting an optical signal to a first active filter node of a plurality of active filter nodes of the antenna. In response to receiving the optical signal, the first active filter node deactivates a corresponding radiating element of a plurality of radiating elements.

20 Claims, 4 Drawing Sheets

(56) References Cited

U.S. PATENT DOCUMENTS

| | | | |
|---|---|---|---|
| 6,865,402 B1 | 3/2005 | Gilbert | |
| 7,335,871 B2 | 2/2008 | Bauhahn et al. | |
| 7,348,928 B2 | 3/2008 | Ma et al. | |
| 7,388,186 B2 | 6/2008 | Berg et al. | |
| 7,573,272 B2 * | 8/2009 | Becker | H01Q 3/247 |
| | | | 324/538 |
| 7,898,464 B1 * | 3/2011 | Anderson | H01Q 3/2676 |
| | | | 342/175 |
| 2002/0181874 A1 * | 12/2002 | Tulchinsky | H01Q 3/2676 |
| | | | 385/39 |
| 2009/0067772 A1 * | 3/2009 | Khurgin | H01Q 3/2676 |
| | | | 385/3 |
| 2013/0063325 A1 * | 3/2013 | Legare | H01Q 3/24 |
| | | | 343/906 |
| 2013/0135060 A1 | 5/2013 | Lee et al. | |
| 2013/0169483 A1 * | 7/2013 | Vidal Drummond | H01Q 3/2676 |
| | | | 342/375 |
| 2016/0126628 A1 * | 5/2016 | McGeehan | H01Q 3/2682 |
| | | | 342/14 |

OTHER PUBLICATIONS

Panagamuwa, C.J. et al., "Frequency and Beam Reconfigurable Antenna Using Photoconducting Switches", IEEE Transactions on Antennas and Propagation, vol. 54, No. 2, Feb. 2006, 6 pages.

Tawk, Y. et al., "Optically Pumped Frequency Reconfigurable Antenna Design", IEEE Antennas and Wireless Propagation Letters, vol. 9, 2010, 4 pages.

* cited by examiner

SYSTEM AND METHOD OF OPTICAL ANTENNA TUNING

FIELD OF THE DISCLOSURE

The present disclosure is generally related to optical antenna tuning.

BACKGROUND

Antennas are used as coupling elements between circuits (e.g., radio frequency (RF) circuits) and a wireless medium. Antenna design usually uses metallic conductors to transfer energy between electromagnetic waves and electrical currents. An antenna's size is usually related to a target wavelength. For example, an antenna may have a characteristic dimension (e.g., length) that is ½ or ¼ of a target wavelength.

Some antennas may be used to operate over a wide operating frequency band. Fixed tuning mechanisms, such as frequency-selective lumped filters (called "traps"), may be used to create multi-band antennas that selectively add reactance to portions of a longer antenna to allow the antenna to operate in frequency bands with shorter wavelengths. Reactance may be added to the portions of the antenna by joining segments of a metallic radiating structure of the antenna using traps or filters. Multi-band antennas may also be created using distributed resonant (LC) element structures.

When a spectral coverage of an antenna is very large, it may be useful to have an antenna that is "active" in the sense that metallic element segments of the antenna may be adjusted remotely. One approach has been to include an extendable telescoping mast in the antenna. A length of the telescoping mast may be varied by using a motor drive system. Using an extendable telescoping mast for an antenna in the microwave region may be impractical, as the antenna may be small and the adjustments may distort the behavior of the antenna.

Another approach to adjust an antenna such that a radiating length is matched to a frequency of interest is to use electrical switches or relays. Control and power circuits used to provide adjustment may disrupt the radiative behavior of the antenna due to parasitic conductors that behave as unwanted radiating elements.

DETAILED DESCRIPTION

Systems and methods of optically tuning an antenna are disclosed. Optical signals (e.g., photonic signals) may be used to actively tune the antenna using an electronic switching device (such as a photosensitive field effect transistor). Metallic radiating segments that form the antenna may be selectively activated or deactivated to tune the antenna to a target frequency of operation. The optical signals may be supplied by a light emitting diode (LED), a laser, or another source. The optical signals may be conveyed to an electronic switching device via a fiber optic cable, a light-guide, or via free-space. The optical signal source may be separated from the antenna by a sufficiently long distance to prevent a field of the antenna from being affected by the optical signal source.

In a particular embodiment, distributed amplifiers may operate as adjustable filters. The distributed amplifiers may adjust parameters (e.g., inductance, capacitance, and/or gain) of the antenna segments. Power-over-fiber (POF) techniques may be used to power the amplifiers. Additionally, optical fibers may be used to provide control signals to the amplifiers. Moreover, the disclosed techniques may be extensible to mass/miniaturized manufacturing techniques.

In a particular embodiment, a method includes determining a configuration of an antenna. The method also includes selecting a first light source of a plurality of light sources based on the configuration. The method further includes activating the first light source and transmitting an optical signal to a first active filter node of a plurality of active filter nodes of the antenna. In response to receiving the optical signal, the first active filter node deactivates a corresponding radiating element of a plurality of radiating elements.

In another particular embodiment, an antenna includes a plurality of active filter nodes and a plurality of radiating elements. Each of the plurality of radiating elements is coupled to a particular active filter node of the plurality of active filter nodes. The antenna also includes a plurality of light sources and a controller. The controller activates a first light source of the plurality of light sources. The first light source, in response to being activated, transmits an optical signal to a first active filter node of the plurality of active filter nodes. The first active filter node deactivates a corresponding radiating element of the plurality of radiating elements in response to receiving the optical signal.

In another particular embodiment, a computer-readable storage device stores instructions that, when executed by a processor, cause the processor to perform operations including determining a configuration of an antenna based on a particular frequency, selecting a first light source of a plurality of light sources based on the configuration, and activating the first light source. The first light source, in response to being activated, transmits an optical signal to a first active filter node of a plurality of active filter nodes of the antenna. The first active filter node deactivates (or adjusts) a corresponding radiating element of a plurality of radiating elements in response to receiving the optical signal.

Figure 1:
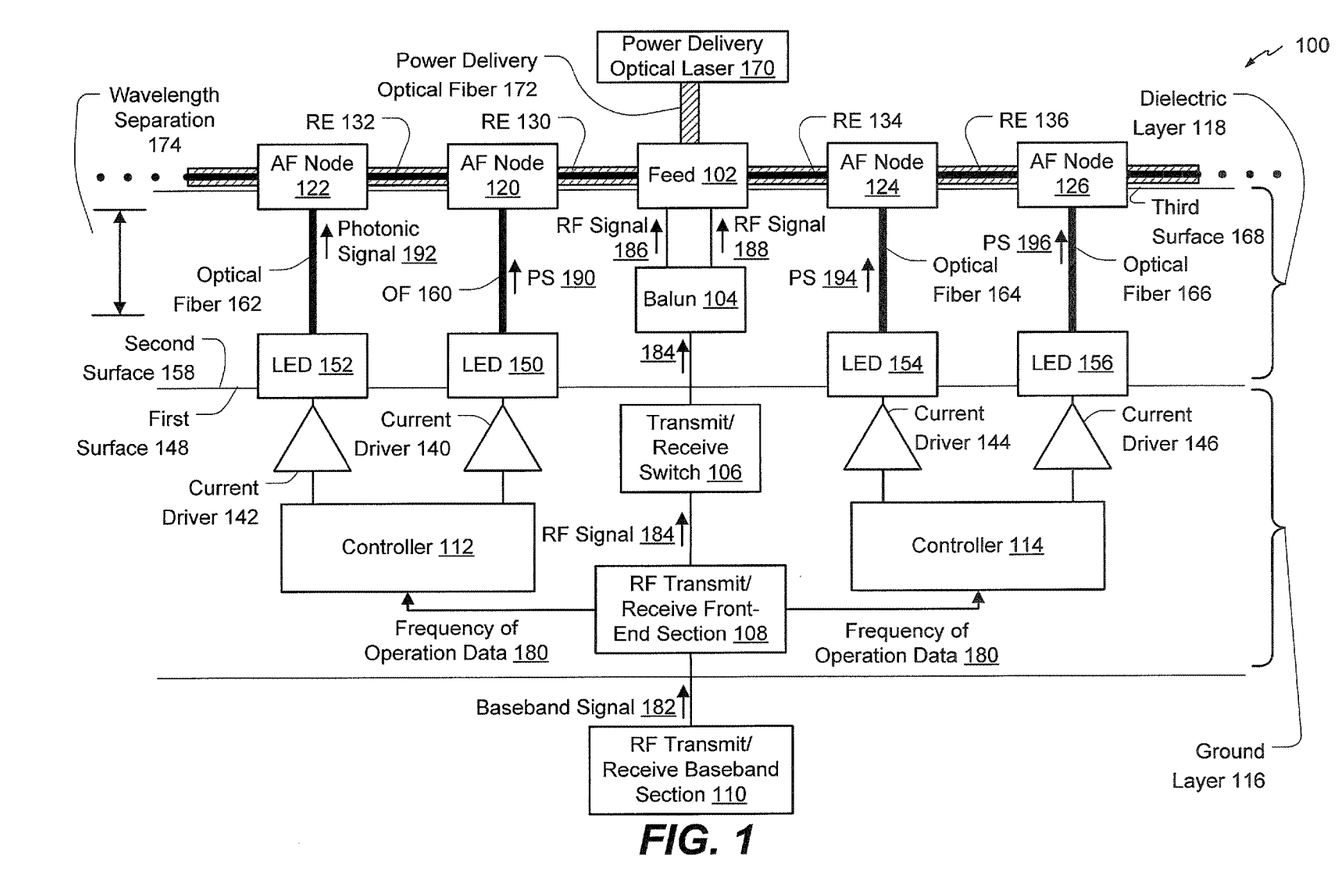
FIG. 1 is a block diagram of a particular illustrative embodiment of an antenna that may be optically tuned.

Referring to FIG. 1, a particular illustrative embodiment of an antenna is disclosed and generally designated 100. The antenna 100 may include a plurality of radiating elements (e.g., radiating elements 130, 132, 134, and 136). One or more of the plurality of radiating elements 130, 132, 134, and 136 may be metallic. The antenna 100 may also include a plurality of active filter nodes (e.g., active filter nodes 120, 122, 124, and 126). A particular illustrative embodiment of an active filter node is described with reference to FIG. 2.

Each of the radiating elements may be coupled to a particular active filter node. For example, the radiating element 130 may be coupled to the active filter node 120, the radiating element 132 may be coupled to the active filter node 122, the radiating element 134 may be coupled to the active filter node 124, and the radiating element 136 may be coupled to the active filter node 126.

The antenna 100 may include a radio frequency (RF) transmit/receive baseband section 110 coupled to an RF transmit/receive front-end section 108. The RF transmit/receive front-end section 108 may be coupled to a feed 102 via a transmit/receive switch (or a duplex filter) 106 and via a balun 104. The RF transmit/receive front-end section 108 may be coupled to one or more controllers (e.g., controllers 112 and 114). In a particular embodiment, the antenna 100 may correspond to a monopole antenna.

Each of the controllers 112 and 114 may be coupled to one or more light sources, such as light emitting diodes (LEDs) (e.g., LEDs 150, 152, 154, and 156). For example, the controller 112 may be coupled to the LED 150 via a current driver 140 and may be coupled to the LED 152 via a current driver 142. As another example, the controller 114 may be coupled to the LED 154 via a current driver 144 and may be coupled to the LED 156 via a current driver 146. In a particular embodiment, one or more of the LEDs (e.g., the LEDs 150, 152, 154, and 156) may be replaced by a laser, or another light source.

In a particular embodiment, each of the light sources may be coupled, via an optical fiber, to a corresponding active filter node. For example, the LED 150 may be coupled, via an optical fiber 160, to the active filter node 120. The LED 152 may be coupled, via an optical fiber 162, to the active filter node 122. The LED 154 may be coupled, via an optical fiber 164, to the active filter node 124. The LED 156 may be coupled, via an optical fiber 166, to the active filter node 126. An optical fiber may also be referred to as a fiber optic cable. In another embodiment, the LEDs 150, 152, 154, 156 may be separated from the active filter nodes 120, 122, 124, 126 by free-space.

In a particular embodiment, the feed 102 may be coupled to a power delivery optical laser 170 via a power delivery optical fiber 172. In this embodiment, each of the active filter nodes 120, 122, 124, and 126 may be coupled to the power delivery optical fiber 172. The feed 102 may be powered by the power delivery optical laser 170 via the power delivery optical fiber 172. In a particular embodiment, one or more of the active filter nodes 120, 122, 124, 126 may be powered by the power delivery optical laser 170 via the power delivery optical fiber 172, as further described with reference to FIG. 2.

A distance (e.g., a wavelength separation 174) between each of the active filter nodes 120, 122, 124, or 126 and a corresponding LED 150, 152, 154, or 156 may be greater than a threshold distance. The wavelength separation 174 may be sufficient such that a field of the antenna 100 is unaffected (or substantially unaffected) by the LEDs 150, 152, 154, and 156 and associated drive circuits. In a particular embodiment, a frequency of operation of the antenna 100 may be based on a number of radiating elements (e.g., radiating elements 130, 132, 134, and 136) that are activated (or tuned).

During operation, the controllers 112, 114 may deactivate one or more of the radiating elements 130, 132, 134, and 136 based on a particular frequency (e.g., megahertz (MHz) or gigahertz (GHz)) of operation. For example, the controller 112 may deactivate one of the radiating elements 130 and 132 based on a first frequency of operation, may deactivate both of the radiating elements 130 and 132 based on a second frequency of operation, and may deactivate neither of the radiating elements 130 and 132 based on a third frequency of operation. In a particular embodiment, the controllers 112, 114 may select radiating elements that are farthest to the feed 102 to achieve the particular frequency of operation. The controllers 112, 114 may receive frequency of operation data 180 from the RF transmit/receive front-end section 108. The frequency of operation data 180 may indicate the particular frequency of operation to which the antenna 100 is to be tuned.

The controllers 112, 114 may deactivate one or more of the radiating elements 130, 132, 134, and 136 using one or more of the LEDs 150, 152, 154, and 156. For example, the controllers 112, 114 may activate a single light source or multiple light sources of the one or more light sources (e.g., the LEDs 150, 152, 154, or 156). To illustrate, the controller 112 may activate the LED 150 using the current driver 140, may activate the LED 152 using the current driver 142, or both. When activated, each of the LEDs 150, 152, 154, and 156 may transmit an optical signal (e.g., a photonic signal 190, 192, 194, or 196) to one or more corresponding active filter nodes 120, 122, 124, and 126. In response to receiving the optical signal (e.g., the photonic signal 190, 192, 194, or 196), each of the corresponding active filter nodes 120, 122, 124, and 126 may deactivate a corresponding radiating element 130, 132, 134, or 136.

In a particular embodiment, each of the one or more corresponding active filter nodes 120, 122, 124, and 126 may activate a corresponding radiating element 130, 132, 134, or 136 in response to the optical signal (e.g., the photonic signal 190, 192, 194, or 196). In this embodiment, each of the corresponding one or more active filter nodes 120, 122, 124, and 126 may deactivate the corresponding radiating element 130, 132, 134, or 136 based on not receiving the optical signal (e.g., the photonic signal 190, 192, 194, or 196) for a threshold duration. For example, the active filter node 120 may receive an optical signal (e.g., the photonic signal 190) at a first time. The active filter node 120 may activate the radiating element 130 in response to receiving the optical signal (e.g., the photonic signal 190). Subsequently, the active filter node 120 may deactivate the radiating element 130 in response to not receiving another optical signal (e.g., the photonic signal 190) within a threshold duration of the first time.

In a particular embodiment, a particular active filter node may operate on (e.g., deactivate, activate, disconnect, connect, partially disconnect, partially connect, or change a reactance of) a single radiating element. For example, the particular active filter node (e.g., the active filter node 120) may be coupled to two radiating elements (e.g., the radiating elements 130 and 132). In response to receiving the photonic signal 190, the active filter node 120 may deactivate only the radiating element 132. In a particular embodiment, in response to receiving the photonic signal 190 the active filter node 120 may deactivate only the radiating element 130.

The optical signal (e.g., the photonic signal 190, 192, 194, or 196) may be transmitted from an LED 150, 152, 154, 156 to a corresponding active filter node 120, 122, 124, 126 via the corresponding optical fiber 160, 162, 164, 166. In a particular embodiment, the optical signal (e.g., the photonic signal 190, 192, 194, or 196) may be transmitted from the corresponding LED 150, 152, 154, 156 to the corresponding active filter node 120, 122, 124, 126 via free-space.

While operating in a transmit mode of operation, the RF transmit/receive baseband section 110 may transmit a baseband signal 182 to the RF transmit/receive front-end section 108. The RF transmit/receive front-end section 108 may generate a radio frequency (RF) signal 184 based on the baseband signal 182. The transmit/receive switch 106 may be set to transmit in the transmit mode of operation. The RF transmit/receive front-end section 108 may transmit the RF signal 184 to the balun 104 via the transmit/receive switch 106. The balun 104 may be used to match the antenna 100 or the one or more active filter nodes 120, 122, 124, and 126. In a particular embodiment, the antenna 100 may correspond to a dipole antenna. In a particular embodiment, the one or more active filter nodes 120, 122, 124, and 126 may include a single-ended switch, a duplexer filter, or both. The balun 104 may generate a plurality of signals (e.g., RF signals 186 and 188) based on the RF signal 184. The balun 104 may transmit the RF signals 186 and 188 to the feed 102.

The feed 102 may transmit the RF signals 186 and 188 to one or more of the radiating elements 130, 132, 134, and 136. For example, the feed 102 may transmit the RF signal 186 to the radiating elements 130 and 132 on one side of the feed 102 and may transmit the RF signal 188 to the radiating elements 134 and 136 on the other side of the feed 102. The activated radiating element(s) of the radiating elements 130 and 132 may transmit the RF signal 186 over a wireless medium. For example, the activated radiating element(s) of the radiating elements 130 and 132 may radiate energy from the RF signal 186 as electromagnetic waves (radio waves) over the wireless medium. Similarly, the activated radiating element(s) of the radiating elements 134 and 136 on the other side of the feed 102 may transmit the RF signal 188 over the wireless medium. The particular frequency of operation to which the antenna 100 is tuned may be based on how many of the radiating elements 130, 132, 134, and 136 are activated. For example, a higher number (e.g., 4) of activated radiating element(s) of the radiating elements 130, 132, 134, and 136 may correspond to a longer antenna and a lower (e.g., 0.5 GHz) frequency of operation. As another example, a lower number (e.g., 2) of activated radiating element(s) of the radiating elements 130, 132, 134, and 136 may correspond to a shorter antenna and a higher (e.g., 1 GHz) frequency of operation. The RF signals 186 and 188 may be transmitted by the activated radiating element(s) of the radiating elements 130, 132, 134, and 136 at the particular frequency of operation to which the antenna 100 is tuned.

In a particular embodiment, the antenna 100 may include a ground layer (e.g., a ground layer 116) aligned with a dielectric layer (e.g., a dielectric layer 118). For example, the dielectric layer 118 may be between the ground layer 116 and the radiating elements 130, 132, 134, and 136. The optical signal (e.g., the photonic signals 190, 192, 194, or 196) may be transmitted from the one or more light sources (e.g., the LEDs 150, 152, 154, or 156) through the dielectric layer 118 to corresponding active filter nodes (e.g., the active filter nodes 120, 122, 124, or 126). In a particular embodiment, each of the one or more light sources (e.g., the LEDs 150, 152, 154, or 156) may be located on (or embedded in) a surface (e.g., a first surface 148) of the ground layer 116. The first surface 148 may be adjacent to a surface (e.g., a second surface 158) of the dielectric layer 118. Each of the plurality of active filter nodes (e.g., the active filter nodes 120, 122, 124, or 126) may be located on another surface (e.g., a third surface 168) of the dielectric layer 118. The second surface 158 and the third surface 168 may be parallel to each other and may be on opposite sides of the dielectric layer 118. To illustrate, the photonic signal 190 may be transmitted from the LED 150 through the dielectric layer 118 to the active filter node 120. Mounting the plurality of active filter nodes (e.g., the active filter nodes 120, 122, 124, or 126) on the dielectric layer 118 may reduce the threshold distance of the wavelength separation 174, decreasing the overall size of the antenna 100.

In a particular embodiment, the optical signal (e.g., the photonic signals 190, 192, 194, or 196) may be transmitted from the one or more light sources (e.g., the LEDs 150, 152, 154, or 156) through at least a portion of the ground layer 116 prior to being transmitted through the dielectric layer 118 to the corresponding active filter nodes (e.g., the active filter nodes 120, 122, 124, or 126). For example, the photonic signal 190 may be transmitted from the LED 150 through at least a portion of the ground layer 116 prior to being transmitted through the dielectric layer 118 to the active filter node 120. The one or more light sources (e.g., the LEDs 150, 152, 154, or 156) may be located within the ground layer 116, on (or embedded in) a surface of the ground layer 116, outside the ground layer 116, or a combination thereof.

In a particular embodiment, the optical signal (e.g., the photonic signals 190, 192, 194, or 196) is transmitted via one or more light guides. For example, the photonic signal 190 may be transmitted from the LED 150 through the dielectric layer 118 via a light guide to the active filter node 120. As another example, the photonic signal 190 may travel from the LED 150 through at least a portion of the ground layer 116 via a light guide prior to being transmitted through the dielectric layer 118 to the active filter node 120.

In a particular embodiment, the optical signal (e.g., the photonic signals 190, 192, 194, or 196) travels in a substantially straight path from the one or more light sources (e.g., the LEDs 150, 152, 154, or 156) to the corresponding active filter nodes (e.g., the active filter nodes 120, 122, 124, or 126). In an alternative embodiment, the optical signal (e.g., the photonic signals 190, 192, 194, or 196) travels in a curved (or angular) path from the one or more light sources (e.g., the LEDs 150, 152, 154, or 156) to the corresponding active filter nodes (e.g., the active filter nodes 120, 122, 124, or 126). For example, the photonic signal 190 may travel via a curved light guide through at least a portion of the ground layer 116, the dielectric layer 118, or both.

In a particular embodiment, the ground layer 116 includes at least a portion of one or more components of the antenna 100. For example, the ground layer 116 may include at least a portion of one or more of the current drivers 140, 142, 144, 146, the controllers 112, 114, the transmit/receive switch 106, the RF transmit/receive front-end section 108, the transmit/receive baseband section 110, the balun 104, the one or more light sources (e.g., the LEDs 150, 152, 154, or 156), the feed 102, the plurality of active filter nodes (e.g., the active filter nodes 120, 122, 124, or 126), or the power delivery optical laser 170.

In a particular embodiment, the dielectric layer 118 may include at least a portion of one or more components of the antenna 100. For example, the dielectric layer 118 may include at least a portion of one or more of the current drivers 140, 142, 144, 146, the controllers 112, 114, the transmit/receive switch 106, the RF transmit/receive front-end section 108, the transmit/receive baseband section 110, the balun 104, the one or more light sources (e.g., the LEDs 150, 152, 154, or 156), the feed 102, the plurality of active filter nodes (e.g., the active filter nodes 120, 122, 124, or 126), or the power delivery optical laser 170.

The controllers 112, 114 may deactivate one or more of the radiating elements 130, 132, 134, 136 using optical signals based on a particular frequency of operation of the antenna 100. Having the dielectric layer 118 between the one or more light sources (e.g., the LEDs 150, 152, 154, or 156) and the corresponding active filter nodes (e.g., the active filter nodes 120, 122, 124, or 126) may reduce the overall size of the antenna 100, making the antenna 100 suitable for miniaturized manufacturing techniques.

Figure 2:
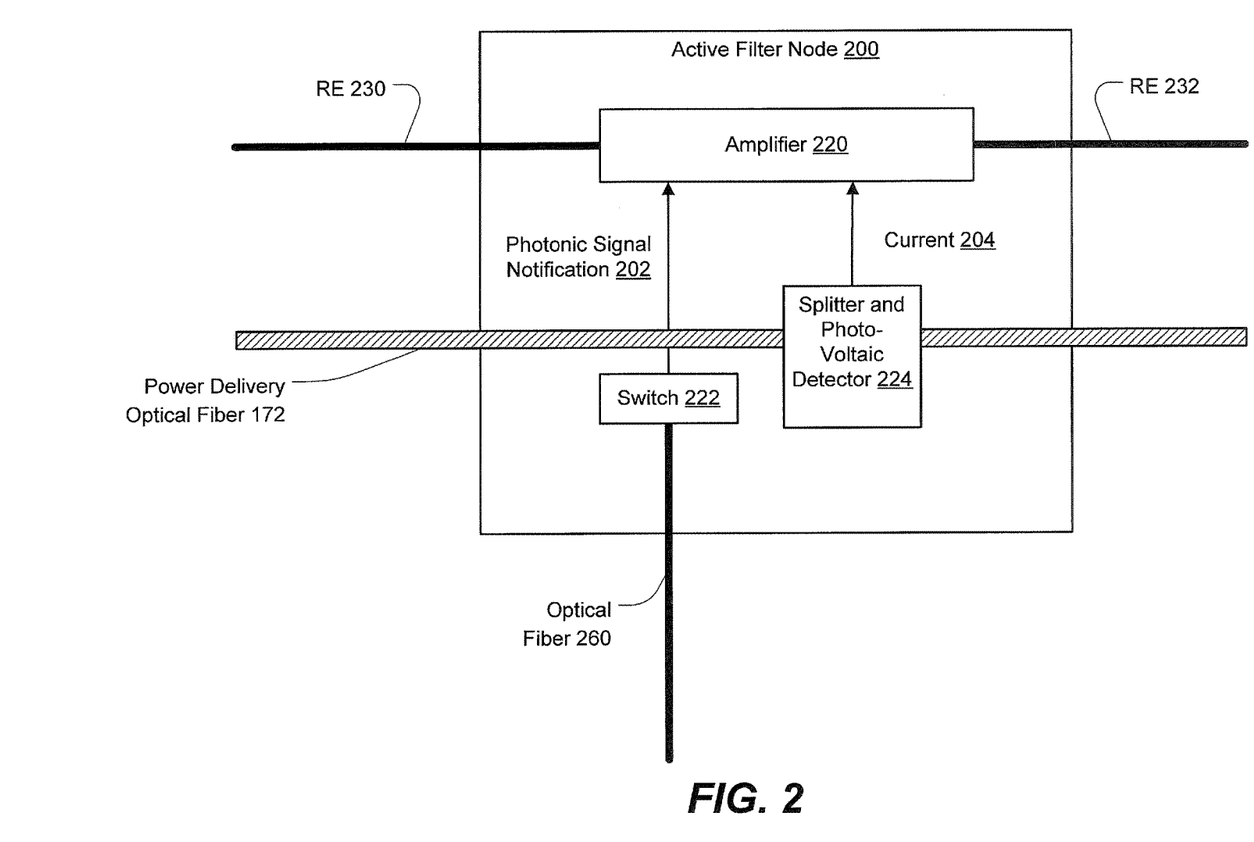
FIG. 2 is a diagram of an illustrative embodiment of an active filter node that may be included in the antenna of FIG. 1.

Referring to FIG. 2, an active filter node is disclosed and generally designated 200. In a particular embodiment, the active filter node 200 corresponds to one of the active filter nodes 120, 122, 124, or 126 of FIG. 1. The active filter node 200 may include a capacitively-coupled radio frequency (RF) bi-directional active filter node. The active filter node 200 includes an amplifier 220 coupled to a radiating element 230 on one side of the amplifier 220 and to a radiating element 232 on another side of the amplifier 220. In a particular embodiment, each of the radiating elements 230 and 232 corresponds to one of the radiating elements 130, 132, 134, and 136 of FIG. 1. In a particular embodiment, the amplifier 220 may include a capacitively-coupled amplifier, a bi-directional amplifier, a radio frequency amplifier, or any combination thereof. The active filter node 200 may, for example, include a Bessel filter transfer function. The active filter node 200 may implement a bi-quadratic transfer function which may synthesize other filters. The active filter node 200 may include a splitter, a photo-voltaic detector, a rectifying photo-voltaic detector, or a combination thereof (e.g., a splitter and photo-voltaic detector 224). The active filter node 200 may be coupled to the power delivery optical fiber 172 via the splitter and photo-voltaic detector 224. In a particular embodiment, the splitter and photo-voltaic detector 224 may include a splitter and a rectifying photo-voltaic detector. The active filter node 200 may include a switch 222. In a particular embodiment, the switch 222 may include a bi-polar transistor, a field effect transistor, an analog photo-responsive switch, an analog photo-responsive resistor, or a combination thereof. The switch 222 may be coupled to an optical fiber 260. In a particular embodiment, the optical fiber 260 corresponds to one of the optical fibers 160, 162, 164, or 166 of FIG. 1.

During operation, the amplifier 220 may receive a photonic signal notification 202 from the switch 222. For example, the switch 222 may transmit the photonic signal notification 202 to the amplifier 220 in response to receiving a photonic signal (e.g., the photonic signal 190, 192, 194, or 196 of FIG. 1). In a particular embodiment, the active filter node 200 corresponds to the active filter node 120 of FIG. 1. In this embodiment, the switch 222 transmits the photonic signal notification 202 to the amplifier 220 in response to receiving the photonic signal 190 of FIG. 1. The amplifier 220 deactivates one or more of the radiating element 230, 232 in response to receiving the photonic signal notification 202. In another particular embodiment, the amplifier 220 may activate one or more of the radiating element 230, 232, in response to receiving the photonic signal notification 202.

In a particular embodiment, the amplifier 220 is powered by the splitter and photo-voltaic detector 224. For example, the splitter and photo-voltaic detector 224 may generate a current 204 based on detecting transmission of light through the power delivery optical fiber 172 and may transmit the current 204 to the amplifier 220.

Thus, the antenna 100 may include the active filter node 200 with the amplifier 220. Use of the active filter node 200 may replace use of trap in the antenna 100. The active filter node 200 may enable the antenna 100 to operate at a higher frequency bandwidth than the trap.

Figure 3:
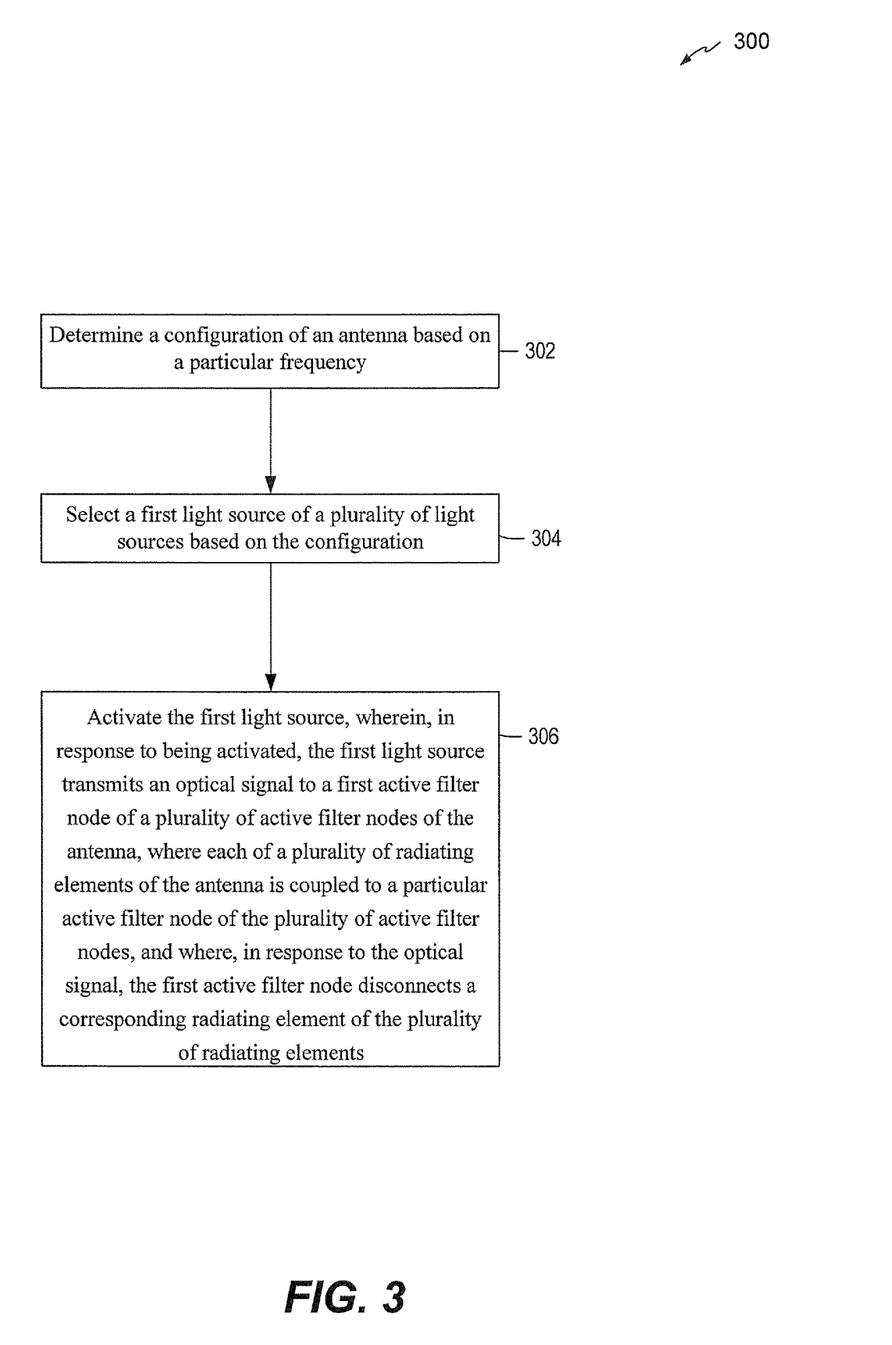
FIG. 3 is a flowchart to illustrate a particular embodiment of a method of optically tuning the antenna of FIG. 1.

FIG. 3 is a flowchart to illustrate a particular embodiment of a method 300 of optically tuning an antenna. In an illustrative embodiment, the method 300 may be performed to tune the antenna 100 of FIG. 1.

The method 300 includes determining a configuration of an antenna based on a particular frequency, at 302. For example, in FIG. 1, the controllers 112, 114 may determine a configuration of the antenna 100 based on a particular frequency using frequency and configuration correlation data. To illustrate, the frequency and configuration correlation data may map specific frequencies (e.g., 1 GHz) to a particular number (e.g., 2) of deactivated (or activated) radiating elements of the plurality of radiating elements (e.g., the radiating elements 130, 132, 134, and 136). Each of the radiating elements 130, 132, 134, and 136 may have an equivalent effect on the frequency of operation of the antenna 100.

For example, a frequency range (e.g., spanning 500 MHz to 2 GHz) may correspond to a particular dipole overall antenna length (e.g., approximately 12 inches). Each of the radiating elements 130, 132, 134, and 136 may correspond to a particular antenna length portion (e.g., 3 inches) when activated. A number (e.g., 12/3=4) of activated radiating elements corresponding to a specific frequency (e.g., 500 MHz) may be based on the particular overall antenna length (e.g., approximately 12 inches) and the particular antenna length portion (e.g., 3 inches). The number (e.g., 4−4=0) of deactivated radiating elements corresponding to the specific frequency (e.g., 500 MHz) may be based on the number (e.g., 4) of activated radiating elements and a total number (e.g., 4) of radiating elements of the antenna 100.

In a particular embodiment, any of the radiating elements 130, 132, 134, and 136 adding up to the particular number are selectable by the controllers 112, 114 to achieve the particular frequency. In an alternative embodiment, the particular number of radiating elements that are farthest (or nearest) to the feed 102 are selectable by the controllers 112, 114 to achieve the particular frequency.

In a particular embodiment, the frequency and configuration correlation data maps the specific frequencies to particular deactivated radiating elements (e.g., the radiating elements 132 and 136), to particular activated radiating elements (e.g., the radiating elements 130 and 134), or to both. A particular radiating element (e.g., the radiating element 132) may affect the frequency of operation of the antenna 100 differently than another radiating element (e.g., the radiating element 130) when activated. In a particular embodiment, the controllers 112, 114 may receive the frequency and configuration correlation data from the RF transmit/receive front-end section 108.

The method 300 also includes selecting a first light source of a plurality of light sources based on the configuration, at 304. For example, in FIG. 1, the controller 112 may select the LED 152 and the controller 114 may select the LED 156 based on the particular number (e.g., 2) of deactivated radiating elements indicated by the configuration.

The method 300 further includes activating the first light source. The first light source, in response to being activated, may transmit an optical signal to a first active filter node of a plurality of active filter nodes of the antenna. Each of a plurality of radiating elements of the antenna may be coupled to a particular active filter node of the plurality of active filter nodes. The first active filter node may deactivate a corresponding radiating element of the plurality of radiating elements in response to the optical signal. For example, in FIG. 1, the controller 112 may activate the LED 152 and the controller 114 may activate the LED 156. The LED 152 may transmit the photonic signal 192 to the active filter node 122 and the LED 156 may transmit the photonic signal 196 to the active filter node 126. The active filter node 122 may deactivate the radiating element 132 in response to receiving the photonic signal 192 and the active filter node 126 may deactivate the radiating element 136 in response to receiving the photonic signal 196.

Thus, the method 300 may enable optical tuning of the antenna 100 to the particular frequency.

Figure 4:
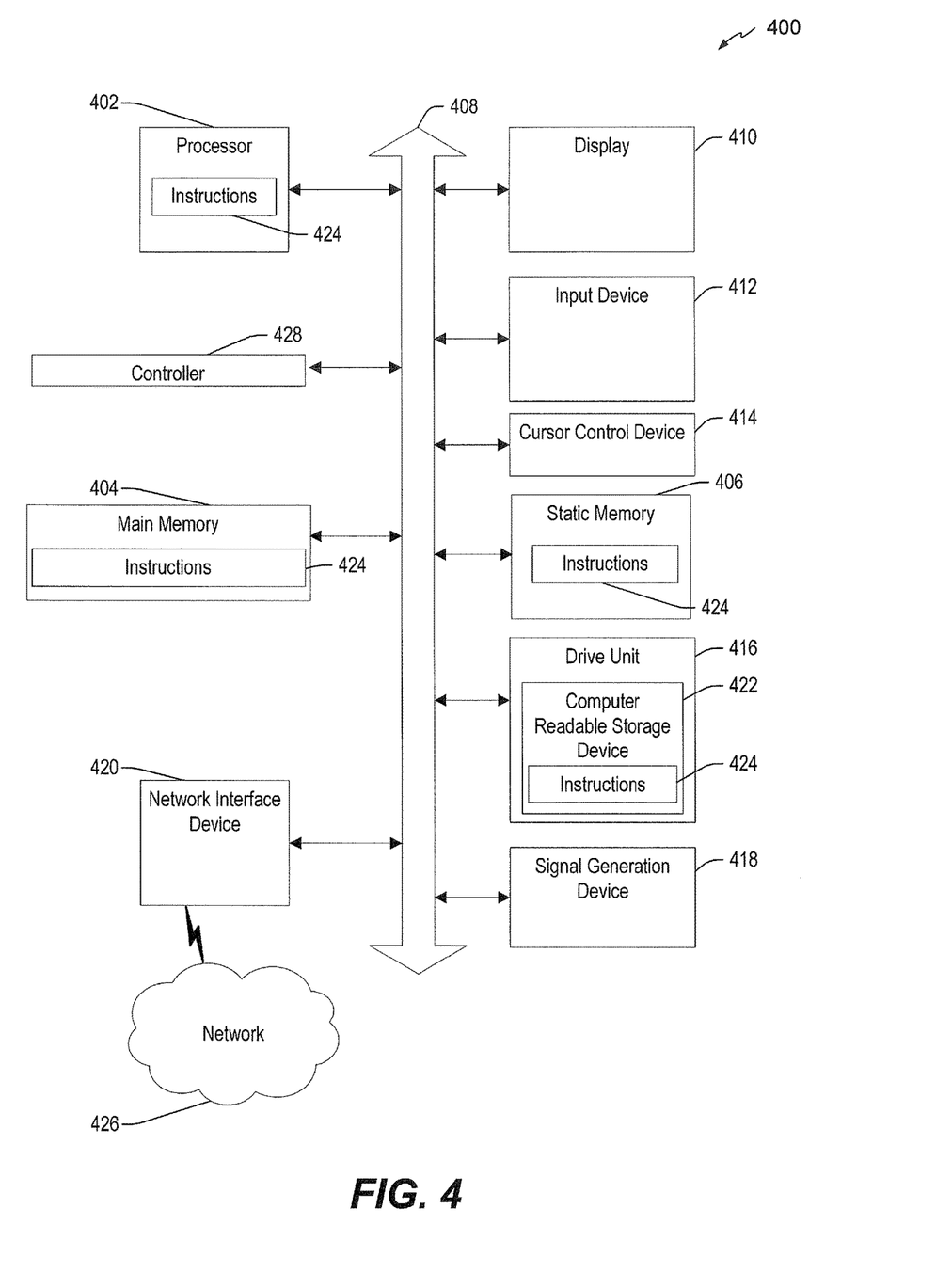
FIG. 4 is a block diagram of an illustrative embodiment of a general computer system operable to support embodiments of computer-implemented methods, computer program products, and system components as illustrated in FIGS. 1-3.

FIG. 4 is a block diagram illustrates an embodiment of a general computer system that is generally designated 400. The computer system 400 may be operable to support embodiments of computer-implemented methods, computer program products, and system components as illustrated in FIGS. 1-3. The computer system 400, or any portion thereof, may operate as a standalone device or may be activated, e.g., using a network, to other computer systems or peripheral devices.

The computer system 400 may be incorporated into a mobile computing device. The mobile computing device may include the antenna 100 of FIG. 1. The antenna 100 may be controlled by a controller 428 of the computer system 400.

The computer system 400 can also be implemented as or incorporated into various devices, such as a tablet PC, a personal digital assistant (PDA), a palmtop computer, a laptop computer, a communications device, a web appliance, a display device, a computing device, or any other machine capable of executing a set of instructions (sequential or otherwise) that specify actions to be taken by that machine. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU). In a particular embodiment, the processor 402 may include multiple processors. For example, the processor 402 may include distributed processors, parallel processors, or both. The multiple processors may be included in, or coupled to, a single device or multiple devices. The processor 402 may be used to support a virtual processing environment. In a particular embodiment, the processor 402 may include a state machine, an application specific integrated circuit (ASIC), or a programmable gate array (PGA) (e.g., a field programmable gate array (FPGA)).

Moreover, the computer system 400 may include a main memory 404 and a static memory 406 that may communicate with each other via a bus 408. In a particular embodiment, the main memory 404 may include processor-executable instructions 424. As shown, the computer system 400 may further include or be coupled to a display unit 410, such as a liquid crystal display (LCD), an organic light emitting diode (OLED), a flat panel display, a solid-state display, or a projection display. Additionally, the computer system 400 may include an input device 412, such as a keyboard, a remote control device, and a cursor control device 414, such as a mouse. In a particular embodiment, the cursor control device 414 may be incorporated into the remote control device. The computer system 400 may also include a disk drive unit 416, a signal generation device 418, such as a speaker, and a network interface device 420. The network interface device 420 may be coupled to other devices (not shown) via a network 426.

In a particular embodiment, one or more of the components of the computer system 400 may be coupled to an antenna or an antenna system (e.g. the antenna 100 or a system coupled to the antenna 100 of FIG. 1). In a particular embodiment, the controller 428 may correspond to the controller 112 of FIG. 1, the controller 114 of FIG. 1, or both.

In a particular embodiment, as depicted in FIG. 4, the disk drive unit 416 may include a tangible computer-readable storage device 422 in which one or more sets of instructions 424, e.g. software, may be embedded. Further, the instructions 424 may embody one or more of the methods or logic as described herein. The processor 402 may execute the instructions 424 to perfotin operations corresponding to one or more of the methods or logic as described herein. The processor 402 may perform the operations directly, or the processor 402 may facilitate, direct, or cooperate with another device or component to perform the operations.

In a particular embodiment, the instructions 424 may reside completely, or at least partially, within the main memory 404, the static memory 406, and/or within the processor 402 during execution by the computer system 400. The main memory 404 and the processor 402 also may include tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein.

The present disclosure describes a computer-readable non-transitory medium that includes instructions 424 so that an antenna may be optically tuned. Further, the instructions 424 may be transmitted or received over the network 426 via the network interface device 420 (e.g., via uploading and/or downloading of an optical antenna tuning application or program, or both).

While the computer-readable non-transitory medium is shown to be a single medium, the term "computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the claims are not limited to such standards and protocols. For example, standards for Internet, other packet switched network transmission and standards for viewing media content represent examples of the state of the art. Such standards are periodically superseded by faster or more efficient equivalents having essentially the same functions. Accordingly, replacement standards and protocols having the same or similar functions as those disclosed herein are considered equivalents thereof.

Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. As the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    transmitting a laser signal from a laser device to an active filter node of a plurality of active filter nodes of an antenna, wherein the laser signal provides power to the active filter node;
    activating a light source of a plurality of light sources based on a target configuration of the antenna, the laser device distinct from each of the plurality of light sources;
    transmitting an optical signal from the light source to the active filter node of the plurality of active filter nodes of the antenna, wherein the active filter node is coupled to a radiating element of a plurality of radiating elements of the antenna; and
    in response to receiving the optical signal at the active filter node, adjusting a characteristic of the radiating element.

2. The method of claim 1, wherein the radiating element is set to an active state responsive to the active filter node receiving the optical signal, the method further comprising:
    deactivating the light source; and
    in response to the active filter node not receiving the optical signal from the light source for a period of time that exceeds a threshold length of time, setting the state of the radiating element to an inactive state.

3. The method of claim 1, further comprising determining the target configuration of the antenna based on a target frequency of operation of the antenna, wherein the laser signal is transmitted via a power delivery optical fiber to each of the plurality of active filter nodes.

4. The method of claim 1, wherein the optical signal is transmitted along a curved path.

5. An antenna system comprising:
    a plurality of active filter nodes;
    a plurality of radiating elements, wherein each radiating element of the plurality of radiating elements is coupled to a corresponding active filter node of the plurality of active filter nodes;
    a laser device configured to transmit a laser signal to an active filter node of the plurality of active filter nodes, wherein the laser signal provides power to the active filter node;
    a plurality of light sources that are distinct from the laser device; and
    a first controller, wherein the first controller is configured to activate a first light source of the plurality of light sources, wherein the first light source is configured to, in response to being activated, transmit an optical signal to the active filter node of the plurality of active filter nodes, and wherein the active filter node is configured to, in response to receiving the optical signal, adjust a characteristic of a radiating element of the plurality of radiating elements.

6. The antenna system of claim 5, further comprising a second controller distinct from the first controller, the second controller configured to activate a second light source of the plurality of light sources and a third light source of the plurality of light sources.

7. The antenna system of claim 5, further comprising:
    a second light source of the plurality of light sources;
    a second active filter node of the plurality of active filter nodes, wherein the laser signal provides power to the second active filter node; and
    a second radiating element of the plurality of radiating elements coupled to the active filter node and the second active filter node, wherein the first controller is configured to activate the second light source, wherein the second light source is configured to, in response to being activated, transmit a second optical signal to the second active filter node, and wherein the second active filter node is configured to, in response to receiving the second optical signal, adjust a second characteristic of the second radiating element.

8. The antenna system of claim 7, further comprising a ground layer and a dielectric layer, wherein the light source and the second light source are located on a first surface of the ground layer, wherein the first surface of the ground layer is adjacent to a second surface of the dielectric layer, and wherein the active filter node and the second active filter node are located on a third surface of the dielectric layer.

9. The antenna system of claim 7, further comprising a ground layer and a dielectric layer, wherein the light source and the second light source are embedded in the ground layer, wherein the light source is configured to transmit the optical signal through the dielectric layer to the active filter node, and wherein the first light source is configured to transmit the optical signal through at least a portion of the ground layer prior to transmission of the optical signal through the dielectric layer.

10. The antenna system of claim 7, wherein adjusting the characteristic of the radiating element adjusts a frequency of operation of the antenna system to a first value, wherein adjusting the second characteristic of the second radiating element, while the characteristic of the radiating element is adjusted, adjusts the frequency of operation of the antenna system to a second value, and wherein the first value is distinct from the second value.

11. The antenna system of claim 5, further comprising a plurality of optical fibers, wherein the first light source is configured to transmit the optical signal to the active filter node via a first optical fiber of the plurality of optical fibers.

12. The antenna system of claim 5, further comprising a power delivery optical fiber coupled to each of the plurality of active filter nodes and configured to carry the laser signal, wherein the first light source is configured to transmit the optical signal to the active filter node via free-space, and wherein each of the plurality of active filter nodes comprises a corresponding amplifier of a plurality of amplifiers.

13. The antenna system of claim 5, further comprising a power delivery optical fiber coupled to each active filter node of the plurality of active filter nodes and configured to carry the laser signal, wherein the active filter node is configured to adjust the corresponding radiating element by adjusting an inductance, a capacitance, a gain, a reactance, or a combination thereof, of the corresponding radiating element.

14. The antenna system of claim 5, wherein the active filter node includes a capacitively-coupled radio frequency bi-directional active filter node, a bi-polar transistor, a field effect transistor, an analog photo-responsive switch, an analog photo-responsive resistor, or a combination thereof.

15. The antenna system of claim 5, wherein the active filter node includes a splitter.

16. The antenna system of claim 5, wherein the active filter node includes a rectifying photo-voltaic detector.

17. The antenna system of claim 5, wherein the active filter node includes an amplifier, and wherein the light source includes a light emitting diode or a laser.

18. A computer-readable storage device storing instructions executable by a processor to perform operations comprising:
 initiate transmission of a laser signal from a laser device to an active filter node of a plurality of active filter nodes of an antenna, wherein the laser signal provides power to the active filter node;
 initiate activation of a light source of a plurality of light sources based on a target configuration of the antenna, the laser device distinct from each light source of the plurality of light sources; and
 initiate transmission of an optical signal from the light source to the active filter node of the plurality of active filter nodes of the antenna, wherein the active filter node is configured to adjust a characteristic of a radiating element of a plurality of radiating elements of the antenna in response to receiving the optical signal.

19. The computer-readable storage device of claim 18, wherein the operations further comprise determining the target configuration of the antenna based on a target frequency of operation of the antenna.

20. The computer-readable storage device of claim 18, wherein the radiating element is adjusted by partially disconnecting or partially connecting the radiating element to another radiating element of the plurality of radiating elements.

* * * * *